(12) United States Patent
Freeman

(10) Patent No.: US 6,895,004 B1
(45) Date of Patent: May 17, 2005

(54) INTERNAL USE ONLY ADDRESSES

(75) Inventor: James N. Freeman, Salt Lake City, UT (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/550,867

(22) Filed: Apr. 17, 2000

(51) Int. Cl.$^7$ .............................................. H04L 12/28
(52) U.S. Cl. ....................................................... 370/389
(58) Field of Search ................................ 370/370, 389, 370/392, 393, 400, 401

(56) References Cited

U.S. PATENT DOCUMENTS

| | | | | |
|---|---|---|---|---|
| 4,823,338 A | * | 4/1989 | Chan et al. | 370/522 |
| 5,331,634 A | * | 7/1994 | Fischer | 370/405 |
| 5,390,173 A | * | 2/1995 | Spinney et al. | 370/393 |
| 5,394,402 A | * | 2/1995 | Ross | 370/402 |
| 5,742,604 A | * | 4/1998 | Edsall et al. | 370/401 |
| 5,946,313 A | * | 8/1999 | Allan et al. | 370/397 |
| 5,958,018 A | * | 9/1999 | Eng et al. | 709/246 |
| 6,023,563 A | * | 2/2000 | Shani | 709/249 |
| 6,101,552 A | * | 8/2000 | Chiang et al. | 709/245 |
| 6,151,324 A | * | 11/2000 | Belser et al. | 370/397 |
| 6,208,649 B1 | * | 3/2001 | Kloth | 370/392 |
| 6,216,166 B1 | * | 4/2001 | Zheng et al. | 709/238 |
| 6,625,124 B1 | * | 9/2003 | Fan et al. | 370/235 |
| 6,735,198 B1 | * | 5/2004 | Edsall et al. | 370/389 |

OTHER PUBLICATIONS

Romano, et al., "Internet Numbers," Aug. 1988, RFC 1062, pp. 1–53.
Braden, "Requirements for Internet Hosts—Communication Layers," Oct. 1989, RFC 1122, pp. 1–100.
Reynolds, et al., "Assigned Numbers," Oct. 1994, RFC 1700, pp. 1–187.
Rekhter, et al., "Address Allocation for Private Internets," Feb. 1996, RFC 1918, pp. 1–8.
Crawford, "Transmission of IPv6 Packets over Ethernet Networks," Dec. 1998, RFC 2464, pp. 1–7.

* cited by examiner

Primary Examiner—Chi Pham
Assistant Examiner—Derrick W Ferris
(74) Attorney, Agent, or Firm—Michael Blaine Brooks PC; Craig A. Hoersten; V. Lawrence Sewell

(57) ABSTRACT

Reservation, request, allocation, assignment and application protocols for conserving addresses requiring unique allocation from a finite address domain. In accordance with the protocols, a set of addresses within the domain are reserved for "intra-switch only" applications so as to be to allocable to a plurality of organizations for assignment and application in a plurality of switches without introducing addressing ambiguities into networks. Other addresses within the domain not having the "intra-switch only" restriction are reserved for a single organization so as to be assigned and applied in a single device to avoid introducing addressing ambiguities into networks. The addresses may be MAC addresses.

15 Claims, 6 Drawing Sheets

INTERNAL USE ONLY ADDRESSES

BACKGROUND OF THE INVENTION

Network equipment manufacturers assign 48-bit identifiers called media access control (MAC) addresses to network devices they make. MAC addresses are allocated to manufacturers in blocks by the Institute of Electrical and Electronics Engineers, Inc. (IEEE) Registration Authority. All MAC addresses in an allocated block include the same three-byte "organizationally unique identifier" (OUI) reserved for the manufacturer.

The allocation of MAC addresses with OUIs is intended to encourage interoperability of network devices. If network devices made by different manufacturers applied in the same network are to communicate unambiguously through exchange of MAC-addressed frames, each network device must be assigned a MAC address that is unique. And since it is not known a priori in which network a device will be applied, each manufacturer must assign to a network device a MAC address which is unique among not only its own manufactured devices, but unique among network devices made by other manufacturers as well. Such global uniqueness is guaranteed by allocating MAC addresses having OUIs.

Although most MAC addresses are used for communication between network devices, as outlined above, use of MAC addresses exclusively within a single network device is becoming more common. One such "internal only" use of MAC addresses arises in the context of exceptional frame forwarding within a LAN switch. Generally speaking, a LAN switch is a multi-port LAN device which interconnects LAN end-stations residing in different LAN broadcast domains, or LAN segments, through different ports on the switch. Such a switch typically forwards conventional frames received from a source end-station over a first port to a destination end-station over a second port based on MAC addressing information encoded in the frame and the switch's knowledge of the port through which the destination end-station can be reached. Such a switch may, however, depart from convention when forwarding certain exceptional frames. To perfect exceptional frame forwarding, MAC addresses may be temporarily assigned to interfaces or ports of the switch and encoded in exceptional frames upon internal transmission to cause such frames to be captured by such interfaces or ports. Such temporarily assigned and encoded MAC addresses are never "seen" on an external LAN transmission medium; they are only "seen" internally.

Because MAC addresses applied in "internal only" uses are never "seen" outside the network device to which they are assigned, maintaining their global uniqueness among network equipment manufacturers to avoid addressing ambiguities is not necessary. Manufacturers nonetheless often assign globally unique MAC addresses (i.e. allocated by the IEEE Registration Authority and having the manufacturer's globally unique OUI) for "internal use only" applications in network devices, reducing the number of globally unique MAC addresses remaining in the available MAC address pool unnecessarily.

As described in Internet Engineering Task Force Requests for Comment (IETF RFCs) 1062, 1122 and 1700, it is known in the context of Internet Protocol (IP) addressing to reserve the network number "127" for a host "loopback" function for use on any IP host such that any IP datagram having a network "127" address loops-back inside the host and never appears on any IP network. However, IP host loopback addressing is directed to a Layer 3 (i.e. routing) protocol. Moreover, there is no suggestion to assign loopback addresses to switching devices or applying such addresses in special processing of inbound datagrams.

As described in RFC 2464, it is also known to locally administer MAC addresses by setting a "U/L" bit at a particular bit position in the 48-bit address. However, locally administered MAC addresses are not reserved for "internal only" uses and may be encoded in frames transmitted on external LAN media.

Accordingly, it would be desirable to implement a reservation, allocation, assignment and application protocol for networking addresses, such as MAC addresses, which takes advantage of the fact that addresses used exclusively in internal applications would not cause addressing ambiguities even if assigned to a plurality of devices in the same network.

SUMMARY OF THE INVENTION

In one aspect, the present invention provides reservation, request, allocation, assignment and application protocols for conserving networking addresses in a finite address domain wherein a portion of the addresses must be uniquely allocated. In accordance with the protocols, a first set of addresses within the domain are reserved for "internal use only" and are allocable to a plurality of organizations for assignment and application in a plurality of devices without risking the introduction of addressing ambiguities into communication networks. A second set of addresses within the domain and not having the "internal use only" restriction are reserved for a single organization and are assigned and applied in a single network device to avoid risking the introduction of addressing ambiguities into networks. The "internal use only" addresses are preferably "intra-switch only" addresses and are allocable to a plurality of organizations for assignment and application in a plurality of switches. The addresses are preferably MAC addresses.

These and other aspects of the present invention may be better understood by reference to the following detailed description taken in conjunction with the drawings briefly described below.

DETAILED DESCRIPTION OF THE PREFERRED EMBODIMENT

Figure 1:
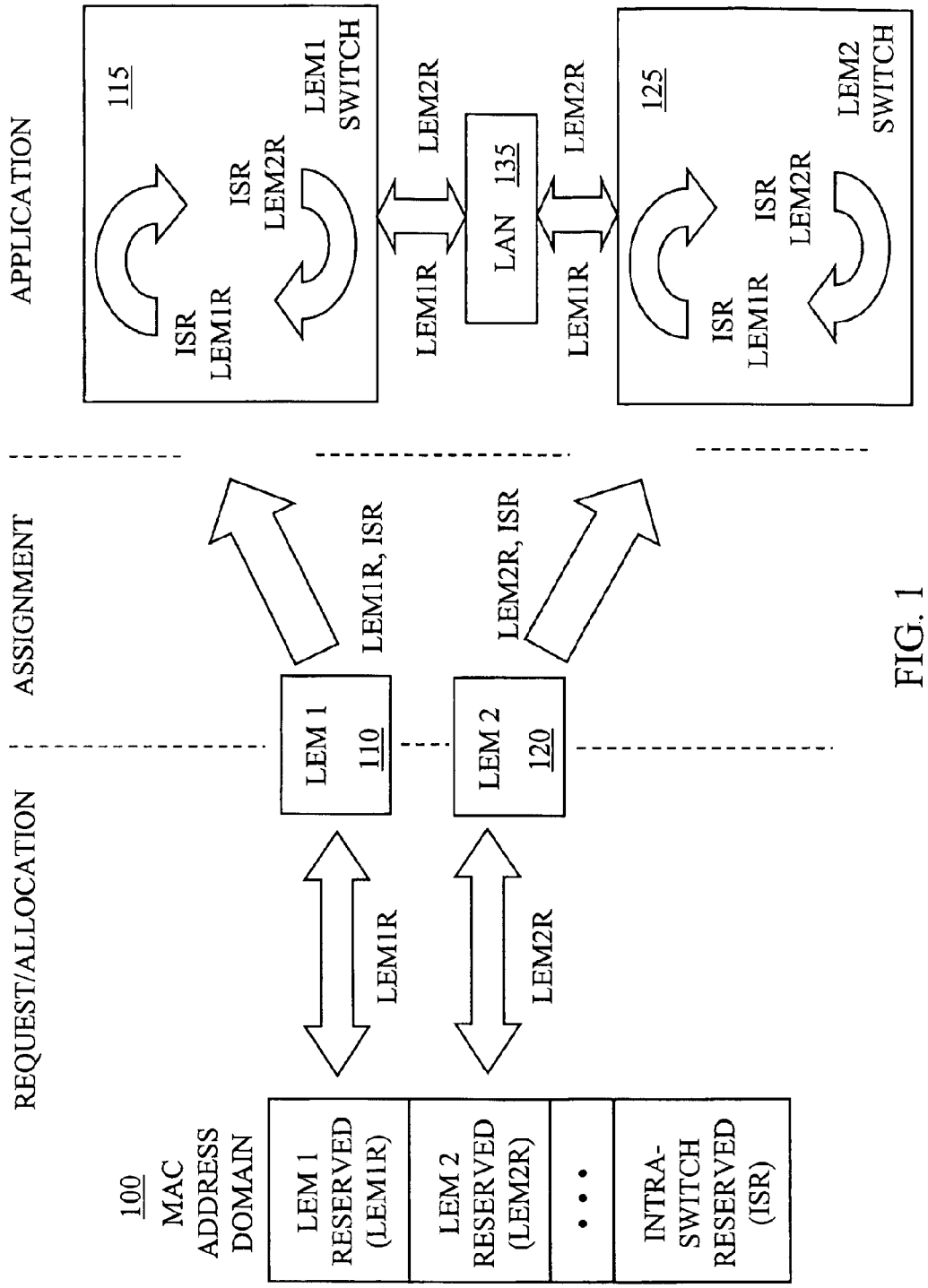
FIG. 1 is a conceptual level diagram illustrating request, allocation assignment and application protocols for MAC addresses in accordance with a preferred embodiment of the invention.

In FIG. 1, preferred reservation, request, allocation and application protocols for MAC addresses are shown at a conceptual level. MAC address domain 100 includes address ranges reserved for LAN equipment manufacturer LEM1 110 (LEM1R addresses), for LAN equipment manufacturer LEM2 120 (LEM2R addresses) and for "intra-switch only" applications (ISR addresses). LEM1R and LEMR2 address ranges are reserved by assigning LEM1 110 and LEM2 120 a three-byte identifier (OUI) and following a convention that all addresses having an OUI as the first three bytes are reserved for the LAN equipment manufacturer to which the OUI has been assigned. Thus, for example, all MAC addresses in the range "00-20-DA-xx-xx-xx" may be reserved for Alcatel Internetworking, Inc., the assignee hereof, by assigning Alcatel Internetworking, Inc. the OUI "00-20-DA". ISR addresses may be used by any LAN equipment manufacturer but are reserved for "internal use only" within LAN switches. ISR addresses may be reserved by assigning an N-byte identifier outside the range of any OUI assigned to a LAN equipment manufacturer and following a convention that all addresses having the N-byte identifier are reserved for "internal use only".

In a preferred request-and-allocation protocol, LAN equipment manufacturers request MAC address allocation and are, generally speaking, allocated blocks of MAC addresses within the range of their assigned OUIs. Thus, as shown, LEM1 110 requests allocation of MAC addresses and in response is allocated a block of addresses within the LEM1R address range. LEM2 120 requests allocation of MAC addresses and in response is allocated a block of addresses within the LEM2R address range. However, it is an important feature of the invention to depart from this basic request-and-allocation protocol with respect to MAC addresses for application exclusively within a LAN switch. For such applications, rather than allocating blocks of addresses within a LAN equipment manufacturer's dedicated address range, addresses from the shared ISR address range are used.

In a preferred assignment protocol, LAN equipment manufacturers assign MAC addresses to LAN switches. Thus, as shown, LEM1 110 assigns LEM1R addresses to LEM1 switch 115 which may be applied internally and externally. Similarly, LEM2 120 assigns LEM2R addresses to LEM2 switch 125 which may be applied internally and externally. However, in an important feature of the invention, LEM1 110 and LEM2 125 also assign ISR addresses to their respective switches 115 and 125 solely for internal application. The ISR addresses assigned by LEM1 110 and LEM2 120 to their respective switches 115 and 125 are from the shared ISR address range within MAC address domain 100 and, therefore, may (but do not necessarily) include one or more identical addresses.

In a preferred assignment protocol, LAN equipment manufacturers assign MAC addresses to LAN switches. Thus, as shown, LEM1 110 assigns LEM1R addresses to LEM 1 switch 1115 which may be applied internally and externally. Similarly, LEM2 120 assigns LEM2R addresses to LEM2 switch 125 which may 5 be applied internally and externally. However, in an important feature of the invention, LEM 1 110 and LEM2 120 also assign ISR addresses to their respective switches 115 and 125 solely for internal application. The ISR addresses assigned by LEM1 110 and LEM2 120 to their respective switches 115 and 125 are from the shared ISR address range within MAC address domain 10 100 and, therefore, may (but do not necessarily) include one or more identical addresses.

Various elaborations of the reservation, request, allocation, assignment and application protocols heretofore described are possible, as described hereinafter. Nevertheless, at a fundamental level, these basic protocols, despite their apparent simplicity, are believed to confer significant advances over the prior art.

Figure 2:
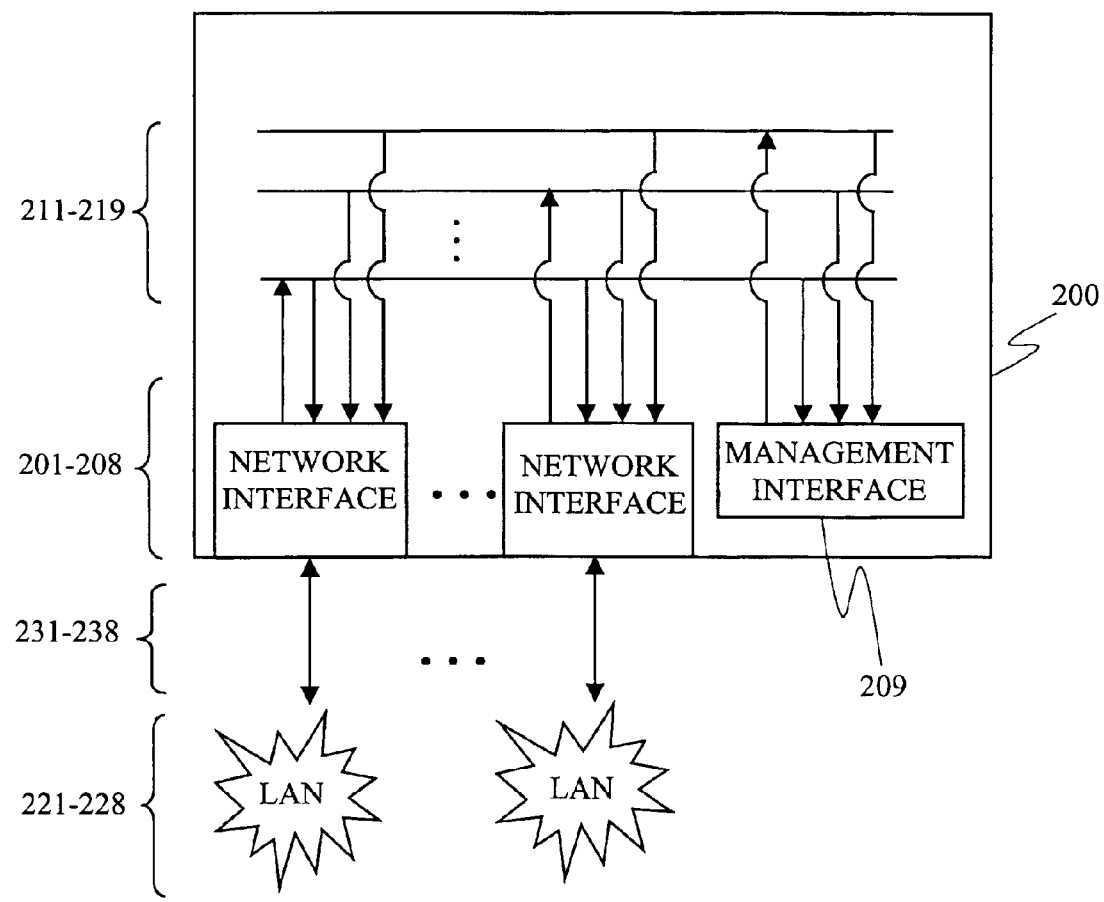
FIG. 2 is a block diagram of a LAN switch in which MAC addresses allocated in accordance with a preferred embodiment of the invention may be assigned and applied.

Referring now to FIG. 2, a LAN switch in which MAC addresses allocated in accordance with a preferred embodiment of the invention may be assigned and applied is shown. Switch 200 includes a matrix of frame buses 211–219 driven by interfaces 201–209, respectively. Interfaces 201–209 include network interfaces 201–208 connected to respective LANs 221–228 via respective transmission media 231–238, and management interface 209. Each bus has a root interfacing with the one of interfaces 201–209 having the exclusive right to transmit frame data on the bus (i.e. the root interface) and leaves interfacing with the plurality of interfaces 201–209 receiving frame data off the bus (i.e. the leaf interfaces). Preferably, each interface is the root interface on one of buses 211–219 and is a leaf interface on all buses 211–219, including the bus for which it is the root interface. Buses 211–219 are broadcast-oriented such that all data bursts propagated on a bus reach all interfaces 201–209. In addition to transmitting and receiving frame data, management interface 209 serves as the "nerve center" of switch 200 which assists network interfaces 201–208 in special frame processing, including processing of Spanning Tree frames as hereinafter described. Of course, the root-to-leaf architecture described above is one of many possible architectures for a switch operative in accordance with the present invention.

Other architectures may have a single common bus between interfaces or "full mesh" matrix providing point-to-point connections between all combinations of interfaces.

Interfaces 201–209 perform filtering checks on frames received of buses 211–219 by looking at MAC addresses in a local header appended to frames. Frames not having as a MAC address an address known by interfaces 201–209 are dropped, or "filtered", subject to certain exceptions. One exception applies when none of interfaces 201–209 recognizes the MAC address. Interfaces 201–209 share the results of filtering checks to avoid filtering frames whose MAC address has not been learned by any interface. Such "unknown destination" frames are captured by all interfaces. More particularly, in an exemplary filtering check, an interface applies the following filtering rules:

Rule 1: If the frame has a MAC address known on the interface, the filtering check is passed. The frame is captured.

Rule 2: If the frame has a MAC address not known on the interface, and the MAC address is known on another interface, the filtering check is failed. The frame is filtered.

Rule 3: If the frame has a MAC address not known on the interface, and the MAC address not known on another interface, the filtering check is passed. The frame is captured.

A frame in this context may be any protocol data unit having a MAC header with a destination MAC address therein. A frame may in certain circumstances encapsulate an entire Network layer protocol data unit (e.g. an entire IP packet). By way of example, frames may be Ethernet protocol data units and Spanning Tree protocol data units.

Figure 3:
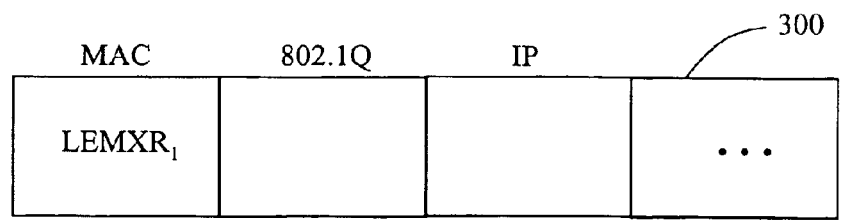
FIG. 3 is a diagram of a conventional frame upon receipt by the LAN switch according to FIG. 2 from a LAN in an exemplary application protocol.
Figure 4:
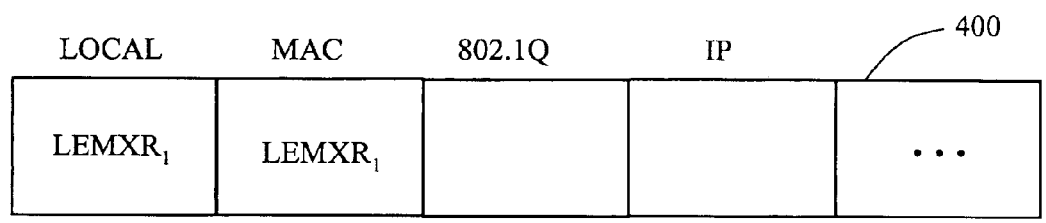
FIG. 4 is a diagram of a conventional frame upon transmission on the backplane of the LAN switch according to FIG. 2 in an exemplary application protocol.
Figure 5:
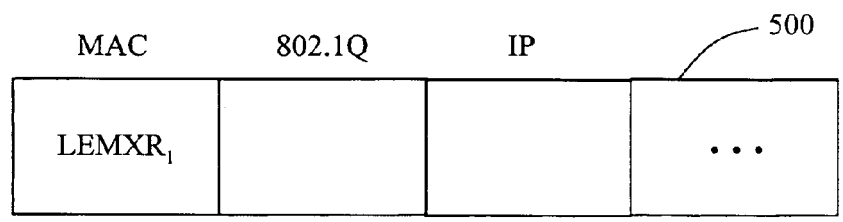
FIG. 5 is a diagram of a conventional frame upon transmission by the LAN switch according to FIG. 2 to a LAN in an exemplary application protocol.
Figure 6:
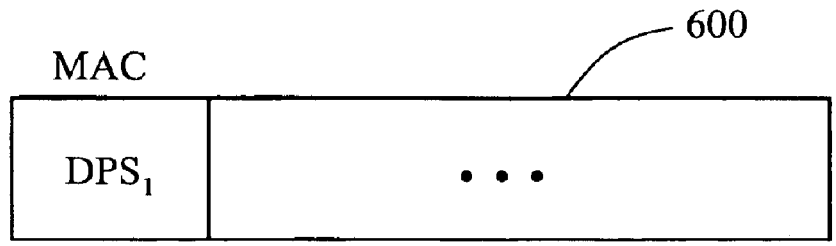
FIG. 6 is a diagram of an exceptional frame upon receipt by the LAN switch according to FIG. 2 from a LAN in an exemplary application protocol.
Figure 7:
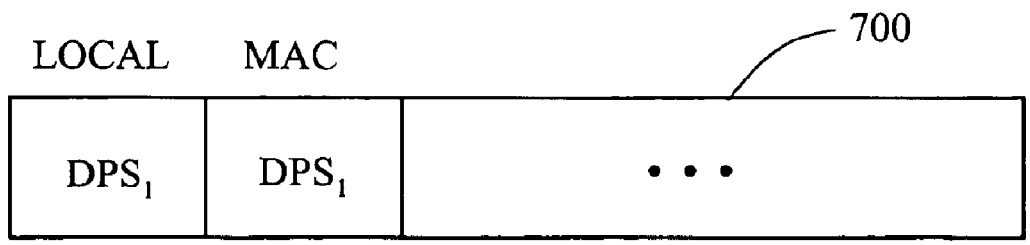
FIG. 7 is a diagram of an exceptional frame upon transmission on the backplane of the LAN switch according to FIG. 2 by a network interface in an exemplary application protocol.
Figure 8:
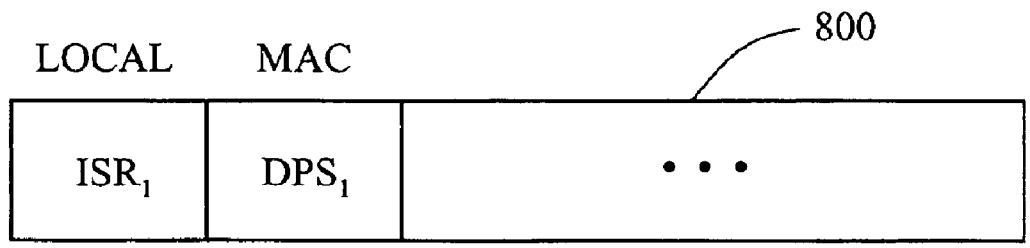
FIG. 8 is a diagram of an exceptional frame upon retransmission on the backplane of the LAN switch according to FIG. 2 by the management interface.
Figure 9:
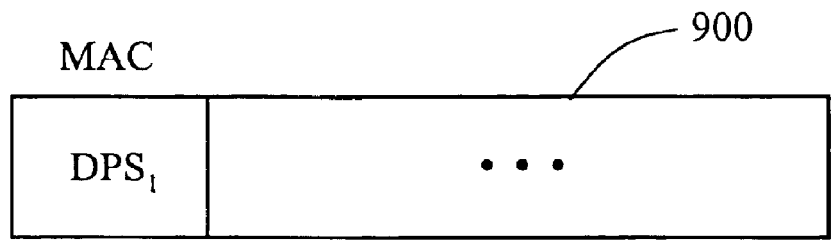
FIG. 9 is a diagram of an exceptional frame upon transmission by the LAN switch according to FIG. 2 to a LAN in an exemplary application protocol.

An exemplary application of conventional and exceptional frame forwarding will now be described by reference to frames traversing switch 200. In FIGS. 3 through 5, an exemplary application of conventional frame forwarding, which does not apply an ISR address, is illustrated. Frame 300, originated by an end-station on a LAN associated with one of network interfaces 201–208 and destined for an end-station on a LAN associated with a different one of network interfaces 201–208 arrives at switch 200. Frame 300 includes a MAC header, an 802.1Q tag, an IP header and additional information not relevant to the present example. The MAC header includes, among other information not shown, a destination MAC address of the destination end-station; in this case a globally unique address allocated to LAN equipment manufacturer X (LEMXR$_1$). The network interface receiving frame 300 from the LAN appends a local header to frame 300 which includes the MAC address LEMXR$_1$ retrieved from the MAC header, resulting in frame 400. Frame 400 is propagated on the one of buses 211–218 for which the receiving network interface is the root interface. Frame 400 is received from the one of buses 211–218 by all interfaces 201–209, which perform filtering checks individually by looking at the MAC address in the local header. The MAC address LEMXR$_1$ is known on the network interface through which the destination end-station is connected to switch 200 (generally as a result of a "source learning" operation performed on a previous frame transmitted by the destination end-station), therefore filtering Rule 1 (above) applies and the frame is captured by such interface. The MAC address LEMXR$_1$ is not known on the other network interfaces or management interface 209, therefore filtering Rule 2 (above) applies and the frame is filtered by such interfaces. The capturing network interface strips the local header from the frame, resulting in frame 500, which is forwarded out the capturing network interface to the destination end-station.

In FIGS. 6 through 9, an exemplary application of exceptional frame forwarding, which applies an ISR address ISR$_1$, is illustrated. In the exemplary application, the exceptional forwarding enables dynamic path selection. Frame 600 includes a MAC header and additional information not relevant to the present example. The MAC header includes, among other information, a destination MAC address; in this case a dynamic path selection address (DPS$_1$). The network interface receiving frame 600 applies a local header to frame 600 which includes the MAC address DPS$_1$ retrieved from the MAC header resulting in frame 700. Frame 700 is propagated on the one of buses 211–218 for which the receiving network interface is the root interface. Frame 700 is received from the one of buses 211–218 by all interfaces 201–209, which perform individual filtering checks by looking at the MAC address in the local header. The MAC address DPS$_1$ is known on management interface 209, which has been configured to recognize the address. Therefore filtering Rule 1 applies and frame 700 is captured by management interface 209. The MAC address DPS$_1$ is not known on network interfaces 201–208, however. Therefore filtering Rule 2 applies and frame 700 is filtered by network interfaces 201–208. Management interface 209 resolves, based on the current state of a dynamic path selection algorithm, on which one of network interfaces 201–208 the frame must be forwarded by switch 200 and generates a frame 800 having a local header including "intra-switch only" MAC address ISR$_1$, which the resolved forwarding network interface has been preconfigured to recognize. The destination MAC address in the MAC header remains DPS$_1$. Frame 800 is propagated, on the backplane, this time on bus 219 for which management interface 209 is the root interface. Frame 800 is received by all interfaces 201–209, which perform individual filtering checks by looking at the MAC address in the local header. The MAC address ISR, is known on the resolved forwarding network interface; therefore, filtering Rule 1 applies and the frame is captured by such interface. The MAC address ISR$_1$ is not known on the other network interfaces or management interface 209; therefore filtering Rule 2 applies and the frame is filtered by such interfaces. The resolved network interface strips the local header from frame 800 resulting in frame 900, which is forwarded out the resolved network interface. In the foregoing manner, an "intra-switch only" MAC address is advantageously applied to effectuate dynamic path selection, resulting in conservation of a globally unique MAC address which would otherwise be used. It will be appreciated that each network interface may be configured to recognize a different "intra-switch only" MAC address such that multiple globally unique MAC addresses are conserved.

Figure 10:
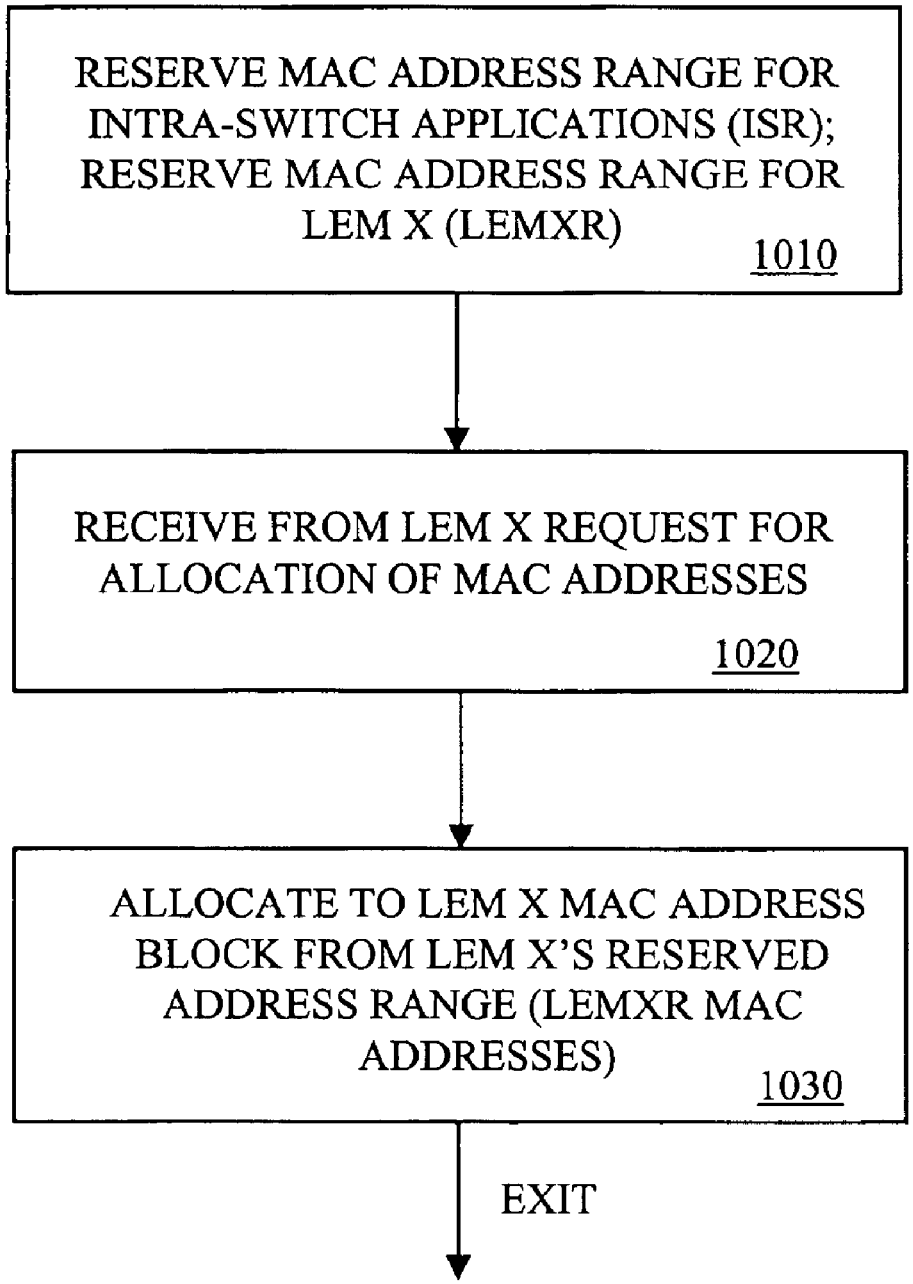
FIG. 10 is a flow diagram of reservation, request and allocation protocols for MAC addresses in accordance with a preferred embodiment of the invention.

Turning now to FIG. 10, a flow diagram illustrating preferred reservation, request and allocation protocols for MAC addresses is presented. Separate and distinct MAC address ranges are reserved for LAN equipment manufacturer X (LEMXR) and for "intra-switch only" applications (ISR) (1010). A request for allocation of MAC addresses from a LAN equipment manufacturer X is received (1020), in response to which the LAN equipment manufacturer is allocated a block of addresses from its reserved address range (LEMXR addresses) (1030).

Figure 11:
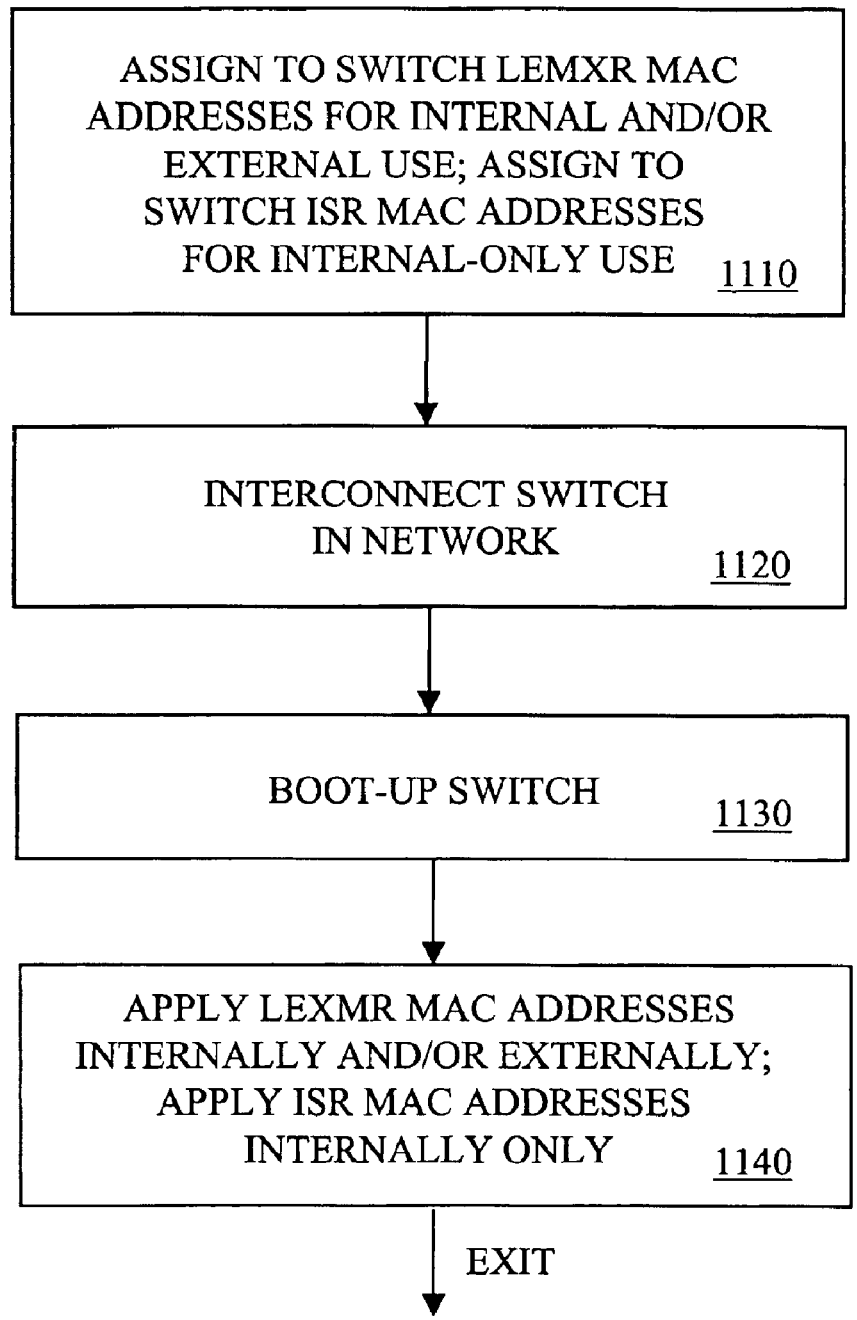
FIG. 11 is a flow diagram of assignment and application protocols for MAC addresses in accordance with a preferred embodiment of the invention.

Turning finally to FIG. 11, a flow diagram illustrating preferred of assignment and application protocols for MAC addresses is presented. LAN equipment manufacturer X assigns MAC addresses to a LAN switch, including (i) for internal and external application, allocated MAC addresses reserved for LAN equipment manufacturer X (LEMXR addresses), and (ii) for "internal use only", MAC addresses reserved for "intra-switch only" applications (ISR addresses) (1110). The switch is interconnected in a network (1120) and booted-up (1130). In network operation, LEMXR addresses are applied internally and externally, whereas ISR addresses are applied exclusively within the switch (1140).

It will be appreciated by those of ordinary skill in the art that the invention can be embodied in other specific forms without departing from the spirit or essential character hereof. The present description is therefore considered in all respects illustrative and not restrictive. The scope of the invention is indicated by the appended claims, and all changes that come within the meaning and range of equivalents thereof are intended to be embraced therein.

I claim:

1. A method for conserving addresses in a finite address domain, comprising:
    reserving an address in the domain for intra-switch only applications, said address being a media access control (MAC) address;
    assigning the address to a switch, said switch comprising a plurality of interfaces coupled to a backplane;

interconnecting the switch in a network; and using the address solely within the switch, whereby data are distributed to at least one of the plurality of interfaces via the backplane without transmitting the address to the network from any of the plurality of interfaces.

2. The method according to claim 1, further comprising repeating the assigning, interconnecting and using steps for a second switch in a second network.

3. A method for conserving addresses in a finite address domain, comprising:

reserving a first address in the domain for a particular manufacture, the first address being a media access control (MAC) address;

reserving a second address in the domain for intra-switch only applications, the second address being a MAC address;

assigning the first address and the second address to a switch, said switch comprising a plurality of interfaces coupled to a backplane;

interconnecting the switch to a transmission medium;

transmitting the first address on the transmission medium; and using the second address solely within the switch to distribute data to at least one of the plurality of interfaces via the backplane without transmitting the second address on the transmission medium.

4. The method according to claim 3, further comprising:

requesting allocation of a reserved address from the domain; and allocating the first address in response to the quest if the requester is the particular manufacturer.

5. A method for conserving addresses in a finite address domain, comprising:

reserving a first media access control (MAC) address in the domain for a first manufacturer;

reserving second MAC address in the domain for a second manufacturer;

assigning the first MAC addresses and a third MAC address to a switch manufactured by the first manufacturer comprising a first plurality of interfaces coupled to a first backplane;

assigning the second MAC address and the third MAC address to a switch manufactured by the second manufacturer comprising a second plurality of interfaces coupled to a second backplane;

interconnecting the switches to respective transmission media;

applying the first MAC address and the second MAC address on the respective transmission media; and applying the third MAC address solely within the respective switches, whereby data are distributed to at least one of the plurality of interfaces of the respective switches via the respective backplane without transmitting the third MAC address to the respective transmission media.

6. The method according to claim 5, further comprising:

locating the first MAC address to the first manufacturer in response to a request by the first manufacturer; and allocating the second MAC address to the second manufacturer in response to a request by the second manufacturer.

7. A switch operative in a network and having a plurality of media access control (MAC) addresses assigned thereto including at least one organizationally unique address and at least one organizationally redundant address, wherein the organizationally redundant address is used solely within the switch, whereby data are distributed via a switch backplane without transmitting the at least one organizationally redundant address on the network.

8. The switch according to claim 7, wherein the organizationally unique address is transmitted outside the switch.

9. A network, comprising:

a first switch having a first MAC access control (MAC) address and a second MAC address assigned thereto;

a second switch having the first MAC address and a third MAC address assigned thereto; and a transmission medium interconnecting the first switch and the second switch;

wherein the first MAC address is transmitted solely within the first switch and the second switch, whereby data are distributed between a plurality of interfaces coupled to a backplane; and wherein the second MAC address and the third MAC address are transmitted between the first switch and the second switch on the transmission medium.

10. A method for conserving MAC addresses, comprising:

reserving a MAC address for intra-device only applications;

assigning the MAC address to a device, said device comprising a plurality of interfaces coupled to a backplane;

interconnecting the device in a network; and using the MAC address solely within the device, whereby data are distributed to at least one of the plurality of interfaces via the backplane without transmitting the MAC address on the network.

11. The method according to claim 10, further comprising repeating the assigning, interconnecting and using steps for a second device in a second network.

12. The method according to claim 10, wherein the device is a switch.

13. A dice operative in a network and having a plurality of MAC addresses assigned thereto including at least one organizationally unique MAC address and at least one organizationally redundant MAC address, wherein the organizationally redundant MAC address is applied solely within the device, whereby data are distributed via a switch backplane without transmitting the organizationally redundant MAC address on the network.

14. The device according to claim 13, wherein the organizationally unique MAC address is applied outside the device.

15. A network, comprising:

a first device having a first MAC address and a second MAC address assigned thereto;

a second device having the first MAC address and a third MAC address assigned thereto; and a transmission medium interconnecting the first device and the second device;

wherein the first MAC address is transmitted solely within the first device and the second device, and the second MAC address and the third MAC address are transmitted between the first device and the second device on the transmission medium.

* * * * *